United States Patent
van Rensburg et al.

(10) Patent No.: US 8,520,537 B2
(45) Date of Patent: *Aug. 27, 2013

(54) SYSTEM AND METHOD FOR SYNCHRONIZED AND COORDINATED BEAM SWITCHING AND SCHEDULING IN A WIRELESS COMMUNICATIONS SYSTEM

(75) Inventors: Cornelius van Rensburg, Wylie, TX (US); Patrick Hosein, San Diego, CA (US); Anthony C. K. Soong, Plano, TX (US)

(73) Assignee: FutureWei Technologies, Inc., Plano, TX (US)

( * ) Notice: Subject to any disclaimer, the term of this patent is extended or adjusted under 35 U.S.C. 154(b) by 917 days.

This patent is subject to a terminal disclaimer.

(21) Appl. No.: 12/534,271

(22) Filed: Aug. 3, 2009

(65) Prior Publication Data

US 2010/0033374 A1 Feb. 11, 2010

Related U.S. Application Data

(60) Provisional application No. 61/087,472, filed on Aug. 8, 2008.

(51) Int. Cl.
*H04W 36/00* (2009.01)

(52) U.S. Cl.
USPC .......... 370/252; 370/329; 370/350; 370/437; 455/436; 455/450; 342/368

(58) Field of Classification Search
None
See application file for complete search history.

(56) References Cited

U.S. PATENT DOCUMENTS

| | | |
|---|---|---|
| 7,274,330 B2 | 9/2007 | Lee |
| 7,274,936 B2 | 9/2007 | Zangi et al. |
| 7,373,176 B2 | 5/2008 | Chotkowski et al. |
| 8,041,313 B2 | 10/2011 | Van Rensburg et al. |
| 8,379,592 B2 | 2/2013 | Van Rensburg et al. |
| 8,396,035 B2 | 3/2013 | Van Rensburg et al. |
| 2004/0224637 A1 | 11/2004 | Silva et al. |
| 2005/0014540 A1 | 1/2005 | Shim |

(Continued)

FOREIGN PATENT DOCUMENTS

| | | |
|---|---|---|
| CN | 1551519 | 12/2004 |
| CN | 1672348 A | 9/2005 |
| WO | WO2007/023515 | 3/2007 |
| WO | WO 2009/040679 A2 | 4/2009 |

OTHER PUBLICATIONS

Fujishima, K., et al., "Technical Proposal for IMT-Advanced, Rev-080009," 3GPP TSG RAN IMT-Advanced Workshop, Shenzhen, China, Apr. 7-8, 2008, pp. 1-23.

(Continued)

*Primary Examiner* — Chi Pham
*Assistant Examiner* — Shick Hom
(74) *Attorney, Agent, or Firm* — Slater & Matsil, L.L.P.

(57) ABSTRACT

A system and method for synchronized and coordinated beam switching and scheduling in a wireless communications system is provided. A method for controller operation includes determining a beam cycle pattern, sharing the beam cycle pattern with neighboring controllers, receiving beam information from a communications device, generating scheduling information from the beam cycle pattern and beam cycle patterns from other controllers, receiving a transmission intended for the communications device, and causing the transmission to be transmitted to the communications device. The beam cycle pattern includes a list of beam patterns transmitted by the controller, and the transmission is transmitted using the scheduling information and the received beam information.

20 Claims, 5 Drawing Sheets

(56) References Cited

U.S. PATENT DOCUMENTS

| | | | |
|---|---|---|---|
| 2005/0057394 A1 | 3/2005 | Lee | |
| 2005/0070331 A1 | 3/2005 | Higuchi et al. | |
| 2006/0203789 A1 | 9/2006 | Iacono et al. | |
| 2007/0097910 A1 | 5/2007 | Ji et al. | |
| 2007/0207838 A1 | 9/2007 | Kuwahara et al. | |
| 2008/0008110 A1 | 1/2008 | Kishigami et al. | |
| 2008/0020715 A1 | 1/2008 | Zangi et al. | |
| 2008/0075033 A1 | 3/2008 | Shattil | |
| 2008/0232492 A1 | 9/2008 | Xiao et al. | |
| 2009/0147869 A1 | 6/2009 | Duan et al. | |
| 2009/0253387 A1 | 10/2009 | Van Rensburg et al. | |
| 2009/0285169 A1 | 11/2009 | Yang et al. | |
| 2010/0080176 A1 | 4/2010 | Maas et al. | |
| 2010/0127931 A1* | 5/2010 | Rensburg et al. | 342/372 |
| 2010/0165926 A1 | 7/2010 | Fukuoka et al. | |
| 2010/0177725 A1* | 7/2010 | van Rensburg | 370/329 |
| 2010/0195527 A1 | 8/2010 | Gorokhov et al. | |
| 2010/0202308 A1 | 8/2010 | Gorokhov et al. | |
| 2012/0076031 A1 | 3/2012 | Zeira | |

OTHER PUBLICATIONS

"3GPP TSG RAN WG1 Meeting #54—Inter-Cell Interference Mitigation Through Limited Coordination," RI-082886, Samsung, Jeju, Korea, Aug. 18-22, 2008, 9 pgs.

"3GPP TSG RAN WG1 Meeting #46—Schedule single vs. multiple beams per frame for E-UTRA," RI-062282, Ericsson, Tallin, Estonia, Aug. 28-Sep. 1, 2006, 5 pgs.

Written Opinion and International Search Report, International Application No. PCT/US09/57837, Applicant: Futurewei Technologies, Inc., Nov. 20, 2009, 6 pages.

European Search Report, Application No. 09815383.6-2411/2311192, Applicant: Huawei Technologies Co., Ltd., Jul. 20, 2011, 8 pages.

Thiele, L., et al., "Capacity Scaling of Multi-User MIMO with Limited Feedback in a Multi-Cell Environment," IEEE, 2007, 8 pages.

Nokia, "New UTRAN Measurement for RRM support of beamforming," 3GPP TSG RAN #21 meeting, Tdoc R1-01-0824, Aug. 27-31, 2001, 6 pages, Turin, Italy.

Hitachi, Ltd., "Interference Management for Broadband Transmission with Antenna Port 5," 3GPP TSG RAN WG1 #55bis, R1-090068, Ljubljana, Slovenia, Jan. 12-16, 2009, 3 pages.

Hosein, P., et al., "On the Performance of Downlink Beamforming with Synchronized Beam Cycles," IEEE, Huawei Technologies, Co., Ltd. 2009, 5 pages.

Zeng, X.N., et al., "Performance Bounds for Space-Time Block Codes with Antenna Selection," International Symposium on Information Theory, ISIT Proceedings, IEEE, Chicago, IL, Jun. 27-Jul. 2, 2004, p. 339.

Sanayei, S., et al., "Antenna Selection in MIMO Systems," IEEE Communications Magazine, vol. 42, No. 10, IEEE Communications Society, Oct. 2004, pp. 68-73.

Pedersen, K., et al., "Application and Performance of Downlink Beamforming Techniques in UMTS," IEEE Communications Magazine, vol. 41, No. 10, IEEE Communications Society, Oct. 2003, pp. 134-143.

Love, D.J., "On the Probability of Error of Antenna-Subset Selection with Space-Time Block Codes," IEEE Transactions on Communications, vol. 53, No. 11, Nov. 2005, pp. 1799-1803.

Liao, W.J., et al., "A Novel Beam Switching Antenna Using RR Switches," IEEE Antennas and Propagation Society International Symposium, IEEE, Honolulu, HI, Jun. 9-15, 2007, pp. 5865-5868.

Baumgartner, T. et a., "Performance of Downlink Beam Switching for UMTS FDD in the Presence of Angular Spread," IEEE International Conference on Communications (ICC 2002), vol. 2, Aug. 2002, pp. 851-855.

Saur, S., et al., "Grid-of-Beam (GoB) Based Downlike Multi-User MIMO," IEEE 802.16 Broadband Wireless Access Working Group, May 5, 2008, pp. 1-4, Alcatel-Lucent Bell Labs, Germany.

"LTE-Advanced—Coordinated Mulitpoint Transmission/Reception," TSG-RAN WG1 #53bis, R1-082469, Discussion, Jun. 30-Jul. 4, 2008, 6 pages, Ericsson, Warsaw, Poland.

"Proposal for LTE-Advanced Technologies," 3GPP TSG RAN WG1 Meeting #53bis, R1-0825, Discussion, Jun. 30-Jul. 4, 2008, pp. 1-36, NTT DoCoMo, Inc., Warsaw, Poland.

"DL Coordinated Beam Switching for Interference Management in LTE-Advanced," 3GPP TSG RAN WG1 #54, R1-083236, Discussion, Aug. 18-22, 2008, 6 pages, Huawei, Jeju, Korea.

* cited by examiner

SYSTEM AND METHOD FOR SYNCHRONIZED AND COORDINATED BEAM SWITCHING AND SCHEDULING IN A WIRELESS COMMUNICATIONS SYSTEM

This application claims the benefit of U.S. Provisional Application No. 61/087,472, filed on Aug. 8, 2008, entitled "System and Method of Synchronized and Coordinated Beam Switching and Scheduling in a Cellular System," which application is hereby incorporated herein by reference.

CROSS-REFERENCE TO RELATED APPLICATIONS

This application is related to the following co-assigned patent applications: Ser. No. 12/412,624, filed Mar. 27, 2009, entitled "System and Method for Wireless Communications;" Ser. No. 61/172,622, filed Apr. 24, 2009, entitled "System and Method for Allocating Beams in a Time-Frequency Space Enable Coordinate Beam Switching in a Wireless Communications System;" and Ser. No. 61/173,404, filed Apr. 28, 2009, entitled "System and Method for Coordinating Electronic Devices in a Wireless Communications System;" which applications are hereby incorporated herein by reference.

TECHNICAL FIELD

The present invention relates generally to wireless communications, and more particularly to a system and method for synchronized and coordinated beam switching and scheduling in a wireless communications system.

BACKGROUND

In general, wireless communications systems using beamforming make use of a number of transmit and/or receive antennas and signal processing to create fixed or adaptive transmit/receive beam patterns. The beam patterns may have a directional nature that may result in a performance improvement when compared with unidirectional transmit and/or receive antennas. The use of the beam patterns may yield a transmit/receive gain over wireless communications systems using unidirectional transmit and/or receive antennas.

As such, beamforming has been promoted as a promising technique to increase cell coverage and to improve cell edge spectral efficiencies. However, one main drawback of beamforming is the so called flashlight effect where the channel quality changes between user equipment (UE) measurement and reporting, and NodeB (NB) transmission, due to the changes in the beam pattern of the interfering neighbouring cells. Coordinated beamforming/switching has been suggested as a possible solution to this problem (see C80216m-08_487, Alcatel_Lucent, "Grid-of-Beams (GoB) Based Downlink Multi-User MIMO", IEEE802.16m, May 2008; NTT DoCoMo, "Proposals for LTE-Advanced technologies", R1-082575, Warsaw, Poland, Jun. 30-Jul. 4, 2008; and co-assigned U.S. patent application Ser. No. 12/412,624, filed Mar. 27, 2009, entitled "System and Method for Wireless Communications," which are incorporated herein by reference).

During the development of Long Term Evolution (LTE), there was much discussion for the flexibility to customize LTE to maximize performance in specific environments. Also, during discussions of LTE-Advanced (LTE-A), many suggestions were made to manage interference level by using coordinated transmissions from different cells (see Ericsson, R1-082469, "LTE-Advanced-Coordinated Multipoint transmission/reception", Warsaw, Poland, Jun. 30-Jul. 4, 2008; and Huawei, R1-083236, "Coordinated Beamforming for Interference management in Advanced E-UTRA", Jeju, Korea, Aug. 25-29, 2008, which are incorporated herein by reference). It is well known that as cell size is decreased in an effort to improve spectral efficiency, interference increases.

What is needed, then, is a method of coordinated beamforming where the coordination information between the cells is very limited and typically changes slowly, and where the coordination requires no additional signaling on the radio interface.

SUMMARY OF THE INVENTION

These and other problems are generally solved or circumvented, and technical advantages are generally achieved, by embodiments of a system and method for synchronized and coordinated beam switching and scheduling in a wireless communications system.

In accordance with an embodiment, a method for controller operation is provided. The method includes determining a beam cycle pattern, the beam cycle pattern including a list of beam patterns transmitted by the controller. The method also includes sharing the beam cycle pattern with neighboring controllers, generating scheduling information from the beam cycle pattern and beam cycle patterns from other controllers, and receiving beam information from a communications device. The method further includes receiving a transmission intended for the communications device, and causing the transmission to be transmitted to the communications device. The transmission is transmitted using the scheduling information and the received beam information.

In accordance with another embodiment, a method for communications device operation is provided. The method includes measuring a first communications channel between a controller and the communications device for each beam pattern in a beam cycle pattern of the controller, thereby producing a plurality of channel estimates, and measuring a second communications channel between a neighboring controller and the communications device for each beam pattern in a beam cycle pattern of the neighboring controller, thereby producing a plurality of interference estimates. The method also includes reporting indices of one of the beam patterns in the beam cycle pattern of the controller and one of the beam pattern in the beam cycle pattern of the neighboring controller meeting a criteria, wherein the criteria is based on the plurality of channel estimates and the plurality of interference estimates.

In accordance with another embodiment, a method for controller operation is provided. The method includes determining a beam cycle pattern, the beam cycle pattern including a list of beam patterns transmitted by the controller. The method also includes sharing the beam cycle pattern with neighboring controllers, and generating scheduling information from the beam cycle pattern and beam cycle patterns from other controllers, the scheduling information includes all combinations of beam patterns in the beam cycle pattern and beam patterns from the beam cycle patterns from neighboring controllers. The method further includes transmitting information related to the beam cycle pattern to a communications device, receiving an index to a preferred beam pattern in the beam cycle pattern and beam patterns from beam cycle patterns from neighboring controllers, receiving a transmission intended for the communications device, and causing the transmission to be transmitted to the communications device, wherein the transmission is transmitted using the received index.

An advantage of an embodiment is that variations in interference may be exploited to improve channel capacity. Since the interference is predictable, the variations may be easily found.

A further advantage of an embodiment is that no hardware modifications to communications equipment are required. Therefore, implementation may be inexpensive and occur rapidly.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a wireless communications system with NodeBs (NB) using beamforming to transmit to User Equipment (UE) using directional beam patterns, where the transmissions of the NBs may be synchronized with one another. The invention may be applied to wireless communications systems using a wide range of wireless access technologies, such as LTE, LTE-Advanced, and so forth. Additionally, the invention may also be applied to NBs using non-directional beam patterns.

Figure 1A:
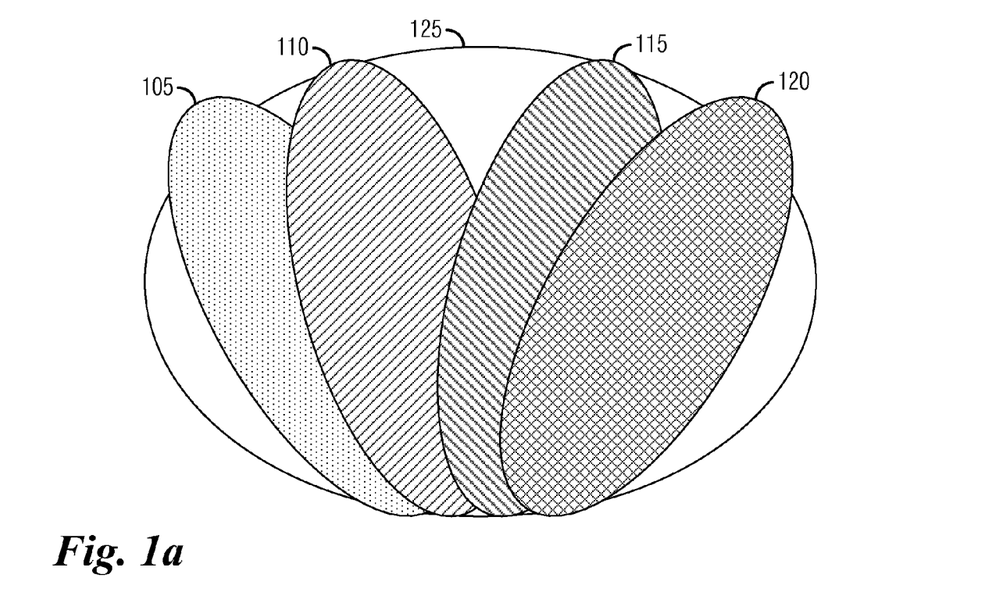
FIG. 1a is a diagram of possible antenna beams from a plurality of antennas.

FIG. 1a illustrates possible antenna beams from a plurality of antennas. As shown in FIG. 1a, there are four directional antenna beams, such as directional antenna beam "BEAM 1" 105, directional antenna beam "BEAM 2" 110, directional antenna beam "BEAM 3" 115, and directional antenna beam "BEAM 4" 120, corresponding to different transmission antennas. FIG. 1a also illustrates an omnidirectional beam 125 that may correspond to the use of all antennas in the plurality of antennas to transmit the signal to be transmitted.

Figure 1B:
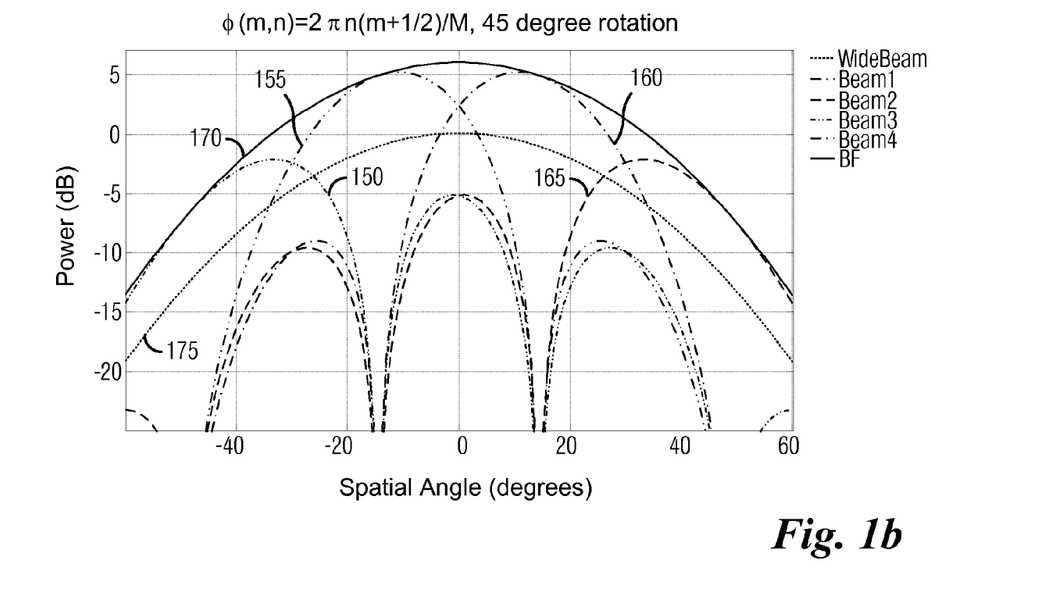
FIG. 1b is a diagram of beam patterns possible from four correlated antennas.

FIG. 1b illustrates beam patterns possible from four correlated antennas. Beams 150, 155, 160, and 165 illustrate individual beams from each one of the four correlated antennas. Beam 170 illustrates a widebeam beam pattern from the four correlated antennas and beam 175 illustrates a summation of the individual beam patterns from the four correlated antennas.

Cell coordination may happen at many levels. At the highest level, a central scheduler has full knowledge of all radio conditions of all UEs in a cluster of cells and tries to find a global optimum selection of UEs to be served at any instant in time. The use of a central scheduler would unfortunately require an excessive overhead on the backhaul, and may be simply impossible to implement considering the fundamental delays on the backhaul transmission. This necessitates the finding of a simpler, less optimal solution that would be easier to implement.

An illustrative embodiment provides a simple solution where different NBs are synchronized on a frame level. The basis of this solution is that since interference cannot be avoided all the time, the only alternative is to manage it effectively. Generally, interference fluctuations are good, as long as they are known. This is because $E\{1/I\}>1/E\{I\}$ for $I\sim\chi^2$ where $\chi^2$ represents a chi-square distribution of a random variable. Here $E\{1/I\}$ represents the condition wherein one knows the interference fluctuations and can link adapt to it, while $1/E\{I\}$ represents the condition wherein one cannot link adapt to the instantaneous interference, but can only link adapt to the average interference.

Consider the following example: Consider a UE that receives a constant signal power of (1 W) from a serving NB. This same UE receives a fluctuating interference power of $I(t_{1...3})=\{1 W, 0.5 W, 1.5 W\}$ from a neighbouring NB. If the UE did not know about the interference fluctuation it would simply average the interference and report a signal to interference ratio of $$SIR=1/\{(1+\tfrac{1}{2}+3/2)/3\}=1.$$

This would result in an average channel capacity of 1 bps/Hz.

However, if the UE was aware of these fluctuations, it would report three signals corresponding to interference ratios of $$SIR=\{1, 2, \tfrac{2}{3}\},$$

which may be used to compute a resulting average channel capacity of $\{\log_2(1+1)+\log_2(1+2)+\log_2(1+\tfrac{2}{3})\}/3=1.11$ bps/

Hz, which is a 10% increase in channel capacity from the above example. Also, if the scheduler may only schedule this UE at its peak SIR, resulting in a peak channel capacity of 1.59 bps/Hz.

As shown above, knowledge of interference fluctuations and exploiting the interference fluctuations may result in a significant increase in channel capacity.

According to an embodiment, each NB in a wireless communications system may transmit using beamforming using a predefined beam cycling pattern. Each NB may have a different beam cycling pattern but with the same period. The beam cycling patterns for the NBs may change slowly over time to meet changes in the operating environment of the wireless communications system. The beam cycling patterns may be a function of traffic distribution in the wireless communications system. Typically, traffic distribution does not change faster than on the order of hundreds (100's) of frames. Alternatively, the NBs may have different beam cycling patterns with different periods.

According to an embodiment, in a fully distributed implementation where there is no backhaul communications between the NBs in a wireless communications system, the NBs may have different beam cycling patterns but they may need to have the same beam cycling pattern periods. The beam cycling pattern period may be of any value, but if there are N possible beam cycling patterns, then the beam cycling pattern period should be at least as big as N to be able to cover each pattern at least once in a cycle. Furthermore, since smaller values are preferable in order to be able to serve a beam with sufficient regularity to maintain quality of service (QoS) requirements for UEs operating within the beam, typically the beam cycling pattern period is set to be equal to the number of beam cycling patterns.

According to an embodiment, in a non-distributed implementation where there is backhaul communications between the NBs in a wireless communications system and the NBs may share beam cycling pattern information, then the beam cycling pattern periods may be different for different NBs.

Figure 2:
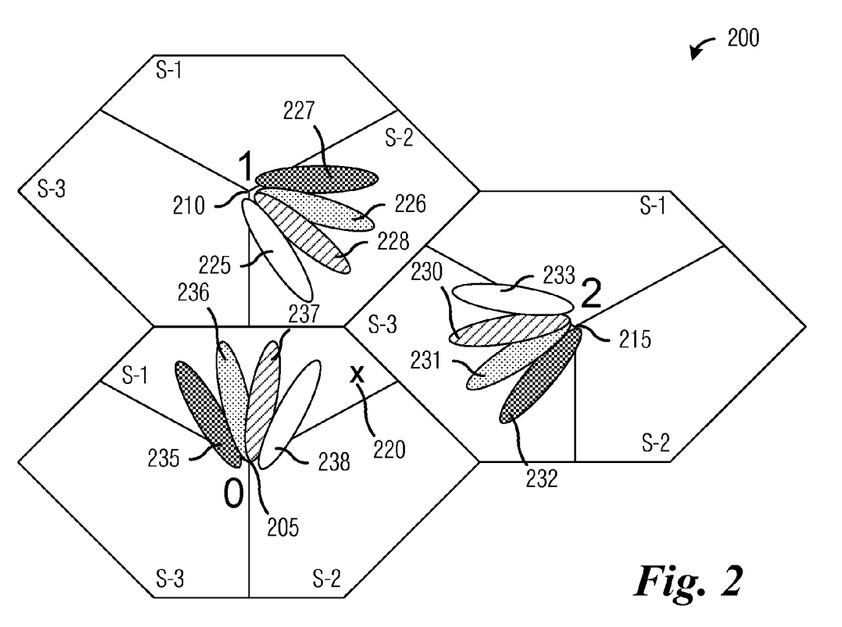
FIG. 2 is a diagram of a cluster of cells in a wireless communications system.

FIG. 2 illustrates a cluster of cells 200 in a wireless communications system. Cluster of cells 200 includes cell "0" 205, cell "1" 210, and cell "2" 215, with each cell in cluster of cells 200 being divided into three sectors, such as sector "S-1," sector "S-2," and sector "S-3." As shown in FIG. 2, sector S-1 may only experience significant interference from sectors S-2 and S-3 of neighboring cells.

However, with the use of different beam patterns that may be spatially distributed throughout a sector, not all beam patterns transmitted by a sector will cause an equivalent amount of interference to a neighboring sector. For example, as shown in FIG. 2, a UE "X" 220 may experience maximum interference from neighboring sector S-2 of cell 1 210 when beam 225 is being transmitted and from neighboring sector S-3 of cell 2 215 when beam 230 is being transmitted. However, when neighboring sector S-2 is transmitting beams 226 or 227, UE X 220 may actually experience little interference since the beam patterns are oriented away from UE X 220. Similarly, UE X 220 may experience little interference when neighboring sector S-3 is transmitting using beams 231 and 232.

Furthermore, multiple beam patterns transmitted by a sector may result in similar amounts of interference. For example, beams 225 and 228 transmitted from neighboring sector S-2 may result in about the same amount of interference to UE X 220. Similarly, beams 230 and 233 transmitted from neighboring sector S-3 may result in about the same amount of interference to UE X 220.

In addition to causing different amounts of interference, the use of different beam patterns by a serving cell may produce signals at different received signal strength levels. For example, with cell 0 205, beams 235 and 236 transmitted in sector S-1 may produce relatively low received signal strength levels at UE X 220, while beam 237 may produce a higher received signal strength level at UE X 220, and beam 238 may produce a highest received signal strength level at UE X 220.

The impact of different beam patterns transmitted by a serving cell on the received signal strength level at a UE along with the interference at a UE caused by different beam patterns transmitted by neighboring cells may introduce interference fluctuations that may be used to schedule transmission to and from a UE to improve channel capacity in a wireless communications system.

Figure 3:
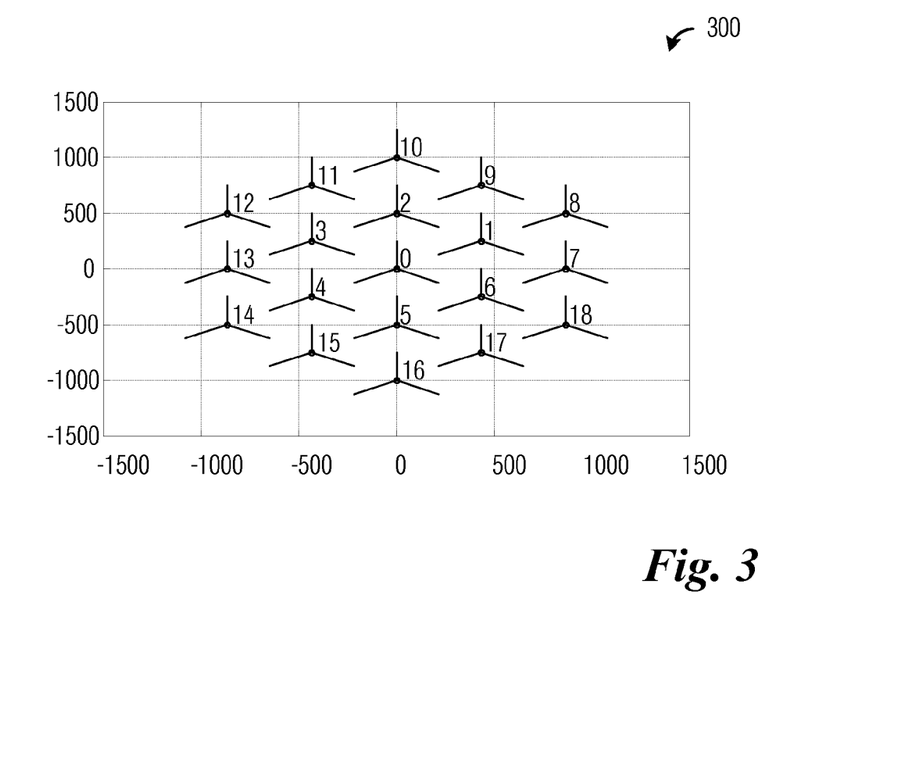
FIG. 3 is a diagram of a cluster of cells arranged in a hexagonal sectorized structure.

FIG. 3 illustrates a cluster of cells 300. Cluster of cells 300 includes a number of cells, numbered from cell "0" to cell "18," arranged in a hexagonal sectorized cell structure. Each cell may be sectorized into three sectors. Each serving cell (NB) may have six neighboring cells. For example, cell 0 may have cells 1-6 as neighboring cells. Transmissions made by neighboring cells may have the greatest impact on the performance of a cell, since non-neighboring cells may be located so far away that their transmissions may not have a significant impact. Therefore, coordinating transmissions with neighboring cells may have the greatest impact on channel capacity of a cell. Furthermore, for a UE operating within a coverage area of a cell, some of the cell's neighboring cells may produce more interference to the UE than other neighboring cells.

With the beam cycling patterns of neighboring cells known (i.e., through information sharing between neighboring cells, signal measurements made by the cell, and so forth), a cell may then create scheduling information based on the beam cycling patterns. In addition to the beam cycling patterns, the cell may receive additional signal measurements, reports, and so on, from UEs that it is serving, which it may use to create the scheduling information. The scheduling information may then be used to schedule transmissions to UEs being served by the cell during times when interference to the UEs from neighboring cell transmissions are minimized. For example, a transmission by cell 0 205 to UE X 220 may be scheduled at times when cell 1 210 is transmitting beam 227 in sector S-2 and cell 2 215 is transmitting beam 232 in sector S-3.

Through the use of beam cycling patterns that are periodic and repeat at known intervals at each of the cells, the beam patterns transmitted by the serving cell and the interference produced by neighboring cells are also periodic, and hence are predictable. The predictable nature of the beam patterns and interference may then be exploited to enhance the channel capacity of the wireless communications system.

Figure 4A:
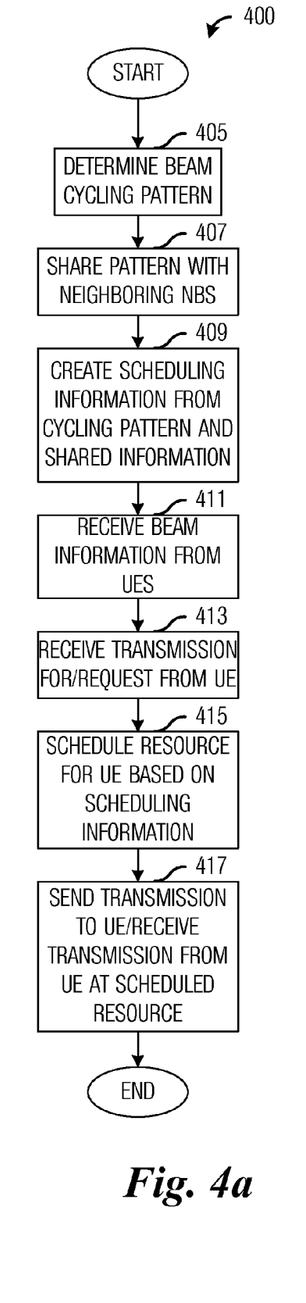
FIG. 4a is a flow diagram of NB operations in coordinated beam switching.

FIG. 4a illustrates a flow diagram of NB operations 400 in coordinated beam switching. NB operations 400 may be indicative of operations taking place in a NB (cell) as it schedules transmissions for UEs that it is serving. The scheduling of transmissions for UEs may comprise two distinct stages. A first stage includes computing scheduling information for UEs that it is serving based on beam cycling patterns from neighboring cells, and a second stage includes scheduling transmissions for the UEs using the scheduling information. NB operations 400 may take place while the NB is in normal operating mode, with the computing of the scheduling information occurring periodically, such as once every few hundred frames, for example. Alternatively, the computing of scheduling information may take place when an event occurs. For example, an event may be a performance metric exceeding a threshold, a traffic distribution being served by the NB changes by a specified amount, a change in beam cycling pattern or period, and so forth.

NB operations 400 may begin with the NB determining a beam cycling pattern (block 405). The beam cycling pattern of the NB may be based on factors such as traffic distribution, nature of traffic, number of UEs being served, UE distribution, and so on. The beam cycling pattern may be derived from a predefined pattern, for example. The NB may also determine the period of its beam cycling pattern. Although the beam cycling pattern may be set at any given time, it may be altered at a later time, when conditions change, for example. Alternatively, the period of the beam cycling pattern may be specified, while the beam cycling pattern may be determined by the NB.

With the beam cycling pattern set, the NB may share its beam cycling pattern (and potentially, beam cycling pattern period) with its neighboring NBs (cells) (block 407). The sharing of the beam cycling pattern may be communicated between the NBs over a backhaul connecting the NBs. The beam cycling pattern may not need to be shared with the UEs served by the NB. In addition to sharing its beam cycling pattern, the NB may receive beam cycling patterns as well as beam cycling pattern periods (if NBs are permitted to have different beam cycling pattern periods) from its neighboring NBs. From its own beam cycling pattern and the beam cycling patterns and beam cycling pattern period from its neighboring NBs, the NB may create scheduling information (block 409).

The scheduling information comprises possible combinations of beam patterns transmitted by the NB and interferers transmitted by neighboring NBs. In addition to the possible beam pattern and interferer combinations, the scheduling information may also include a time value, a time offset, a subframe number, a subband number, or some other time or frequency band related information, for each beam pattern combination to indicate when and where the particular beam pattern and interferer combination occurs. The scheduling information may be stored in a memory for subsequent use by the NB. The scheduling information may be stored in the form of a table, such as a look-up table, for example, or a list.

The NB may then transmit pilots or other reference sequences using the beam patterns as specified in the beam cycle pattern. Although the pilots or other reference sequences may be beamformed, common pilots transmitted by the NB may not need to be beamformed. The pilots or other reference sequences may be measured by the UEs served by the NB, i.e., the UEs may perform channel estimation on the NB.

The NB may then receive beam information from the UEs that it is serving (block 411). The beam information may be signal to interference ratio measurements made by the UEs for the various beam patterns. For example, the NB may transmit pilots or other reference sequences beamformed using the various beam patterns and the UEs may make signal to interference ratio measurements of the pilots (or other reference sequences) and report the largest signal to interference measurement back to the NB. Since the beam cycle pattern is expected to change slowly, a Layer Three (L3) message may be used to transmit the beam information. The beam information may then be associated with the UE sending the beam information.

According to a preferred embodiment, only the NB serving a UE that is the source of the beam information may be required to decode the beam information since the beam cycle pattern has already been determined and shared between the NBs.

Alternatively, the NB may wait to receive beam information from the UEs prior to creating the scheduling information. The NB may make use of the beam information from the UEs to create the scheduling information. For example, the NB may use strongest interferer information provided by the UEs to reduce the amount of information in the scheduling information by creating the scheduling information for a specified number of the strongest interferers instead of all possible interferers. Additionally, the beam information from the UEs may allow the NB to perform beam substitution, wherein beams producing similar levels of interference may be substituted. This may further help to reduce the amount of scheduling information. A detailed description of beam substitution is provided below.

The NB may then receive a transmission intended for a UE that it is serving or a transmission request from a UE that it is serving (block 413). The NB may make use of the scheduling information along with the beam information provided by the UE to determine a network resource(s) to allocate to the transmission (block 415). The amount of network resource(s) allocated to the UE may be dependent on factors such as the size of the transmission, the amount of available network resources, the amount of time that has expired since the UE has received a transmission or has transmitted, the priority of the transmission, the priority of the UE, and so forth. If the NB received a transmission request from the UE, then the NB may send an indication to the UE indicating the network resource(s) allocated to the UE.

The NB may then transmit to the UE at the allocated network resource(s) or receive a transmission from the UE at the allocated network resource(s) (block 417). NB operations 400 may then terminate.

Figure 4B:
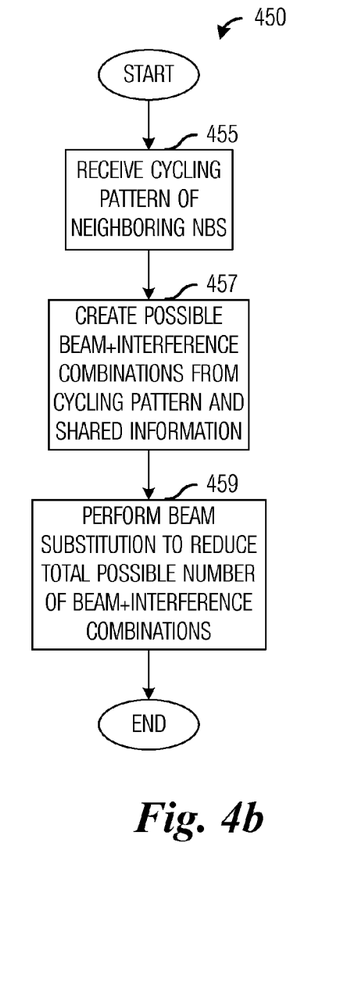
FIG. 4b is a flow diagram of NB operations in the computing of scheduling information.

FIG. 4b illustrates a flow diagram of NB operations 450 in the computing of scheduling information. NB operations 450 may be an implementation of block 409 in NB operations 400, creating scheduling information from beam cycling pattern and shared information from neighboring NBs.

NB operations 450 may begin with the NB receiving beam cycling pattern information from neighboring NBs (block 455). Additionally, if the beam cycling pattern periods are different for different NBs, then the NB may receive beam cycling pattern periods from the neighboring NBs. The NB may make use of its own beam cycling pattern and the beam cycling pattern information from neighboring NBs to create scheduling information comprising all possible beam pattern and interferer combinations (block 457). Alternatively, the NB may create scheduling information comprising all possible beam pattern and interferer combinations for only those neighboring NBs that are deemed as strongest interferers. By not creating scheduling information with neighboring NBs that are not strong interferers, the amount of scheduling information may be reduced. The scheduling information may be stored in a memory in the form of a table or a list, for example.

As discussed above, some beam patterns may result in similar levels of interference to a UE, it may be possible to reduce the size of the scheduling information to reduce storage requirements by substituting beams producing similar levels of interference (block 459). This may be referred to as beam substitution. In general, due to sectorization, beams usually work in pairs. If a beam acts as a strong interferer, then there is probably another beam that would also act as a strong interferer. Similarly, since the beam patterns are generally distributed in space, if some of the beam patterns are strong interferers, then some of the remaining beam patterns will likely be small or reasonable interferers. Combining like beams may help to reduce the amount of scheduling information.

Referring back to FIG. 2, consider UE X 220 which reports beam 238 transmitted by sector S-1 of cell 0 205 as best beam pattern. UE X 220 may also report beam 232 as best interfering beam (i.e., lowest interferer). If the beam pattern and interferer combination of (beam 238, beam 232) does not exist in the scheduling information, then the NB may substitute the beam pattern and interferer combination of (beam 238, beam 231), which may be in the scheduling information. Similarly, UE X 220 may also report beam 227 as the second best interferer (i.e., second lowest interferer). If the beam pattern and interferer combination of (beam 238, beam 232, beam 227) does not exist in the scheduling information, then the NB may substitute the beam pattern and interferer combination of (beam 238, beam 231, beam 226), which may be in the scheduling information. NB operations 450 may then terminate.

For discussion purposes, assume that all cells within a cluster of cells each have four correlated antennas with beam patterns as shown in FIG. 1b and a hexagonal sectorized cell structure as shown in FIG. 3. The hexagonal sectorized cell structure with correlated antennas is used because it is easy to visualize. Other cell layouts and configurations may be utilized without loss of generality of the embodiments. With three sectored cells, a UE operating in a sector of a cell, e.g., sector one (1) will experience maximum interference from sectors two (2) and three (3). This implies that instead of creating scheduling information for every possible cell and sector combination, each of the three sectors in a cell may have scheduling information based on cycling patterns from two sectors from cells immediately adjacent to the sector (the strongest interferers).

Then, with a beam cycling pattern period four (4), Table 1 illustrates a portion of the scheduling information for sector S-1 of cell 0 205. As shown in Table 1, only the two strongest interferers of sector S-1 of cell 0 205 are represented. Additional interferers may be included at the expense of a larger table. Table 1 illustrates 16 subframes (SF) of the scheduling information. The rows of Table 1 illustrate beam pattern number being transmitted in a sector during a particular SF. For example, in SF three ($SF_3$), all three sectors S-1 are transmitting beam pattern number 4, while in SF seven ($SF_7$), sector S-1 is transmitting beam pattern number 4, sector S-2 is transmitting beam pattern number 1, and sector S-3 is transmitting beam pattern number 2.

This means that in a subsequent network cycle, subframe five will have the NB transmitting on beam pattern number two (2) and neighboring sector S-2 is transmitted on beam pattern number three (3) and neighboring sector S-3 is transmitting on beam pattern number four (4) and the UE will measure the same signal to interference ratio.

Although Table 1 shows each NB cycling through its beam patterns in four subframes, it may take up to 16 periods with four subframes per period to cycle through all beam pattern and interference combinations. In general, with a hexagonal sectorized cell structure and three sectors per cell, it will take beam_cycle_period$^3$=$4^3$=64 subframes to cycle through all possible beam pattern and interference combinations. However, it may be possible to reduce the number of subframes through beam substitution as discussed above.

Generally, it is desired that a network cycle of the scheduling information be relatively short in duration since an overly long cycle may space desirable subframes and network resources therein too far apart. This may result in unacceptable delay between consecutive transmission opportunities. Therefore, it may be desirable to make the beam pattern cycle periods short and equal for each sector of each NB.

A period of the network cycle (T) may be given by a least common multiple of a set of beam cycle periods of the sectors and NBs. For example, a first sector has a beam cycle pattern of 1 2 1 2 1 2 1 2 with a beam cycle pattern period of two (2), a second sector has a beam cycle pattern of 1 2 4 3 1 2 4 3 with a beam cycle pattern period of four (4), and a third second has a beam cycle pattern of 1 1 1 2 2 2 3 4 with a beam cycle pattern period of eight (8), then the period of the network cycle would be the least common multiple of 2, 4, and 8 or 8. If a UE measures a signal to interference ratio at time index K (an index related to subframes, for example), then the next time the UE will experience the same signal to interference ratio will be at time K+T.

When determining a beam cycle pattern for a sector and NB, in addition to considering user location and traffic, interference statistics should be considered. Interference statistics is generally not directly available, but it can be inferred. In this way, the computing of the scheduling information may be able to avoid beam patterns that experience high interference. Essentially, each sector optimizes resources locally based on a near static state of the wireless communications system. As time progresses, the optimization becomes less optimal (as

TABLE 1

Beam cycling pattern for 3 different sectors across 16 subframes (SF's)

| Sector | $SF_0$ | $SF_1$ | $SF_2$ | $SF_3$ | $SF_4$ | $SF_5$ | $SF_6$ | $SF_7$ | $SF_8$ | $SF_9$ | $SF_{10}$ | $SF_{11}$ | $SF_{12}$ | $SF_{13}$ | $SF_{14}$ | $SF_{15}$ |
|---|---|---|---|---|---|---|---|---|---|---|---|---|---|---|---|---|
| | Period 1 | | | | Period 2 | | | | Period 3 | | | | Period 4 | | | |
| S-1 | 1 | 2 | 3 | 4 | 1 | 2 | 3 | 4 | 1 | 2 | 3 | 4 | 1 | 2 | 3 | 4 |
| S-2 | 1 | 2 | 3 | 4 | 2 | 3 | 4 | 1 | 3 | 4 | 1 | 2 | 4 | 1 | 2 | 3 |
| S-3 | 1 | 2 | 3 | 4 | 3 | 4 | 1 | 2 | 1 | 2 | 3 | 4 | 3 | 4 | 1 | 2 |

The scheduling information may then be used as follows to schedule a transmission to a UE or a transmission opportunity of a UE. If the NB receives a transmission for a UE operating in sector S-1, which in the past has indicated that it measured a highest signal to interferer ratio when the NB is transmitting on beam pattern number two (2) and neighboring sector S-2 is transmitted on beam pattern number three (3) and neighboring sector S-3 is transmitting on beam pattern number four (4). The NB may then find in the scheduling information that the particular combination of beam patterns corresponds to subframe five ($SF_5$). The NB may then allocate network resource(s) in subframe five to the UE if any are available.

other sectors make changes, traffic changes, UEs move, and so forth) and after some point in time, the sectors may need to re-optimize the resources.

Figure 4C:
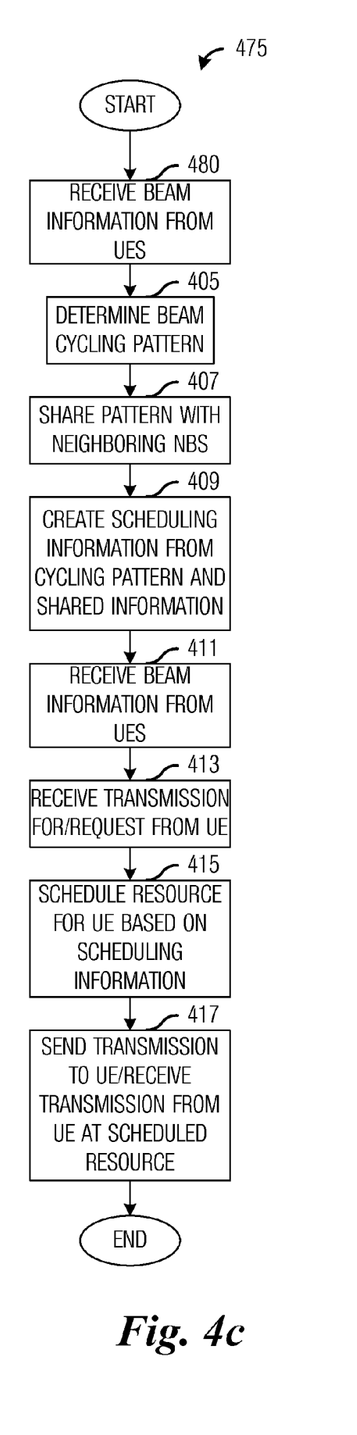
FIG. 4c is a flow diagram of NB operations in coordinated beam switching.

FIG. 4c illustrates a flow diagram of NB operations 475 in coordinated beam switching. NB operations 475 may be indicative of operations taking place in a NB (cell) as it schedules transmissions for UEs that it is serving. NB operations 475 may be substantially similar to NB operations 400 discussed previously, with an exception being that prior to determining a beam cycling pattern and potentially beam cycling pattern period (block 405) and sharing the beam cycling pattern (with beam cycling pattern period) with neighboring NBs (block 407), NB may receive beam information from UEs served by the NB (block 480).

As with receiving beam information from UEs (block 411), the beam information may be signal to interference ratio measurements made by the UEs for the various beam patterns. For example, the NB may transmit pilots or other reference sequences beamformed using the various beam patterns and the UEs may make signal to interference ratio measurements of the pilots (or other reference sequences) and report the largest signal to interference measurement back to the NB.

Figure 5:
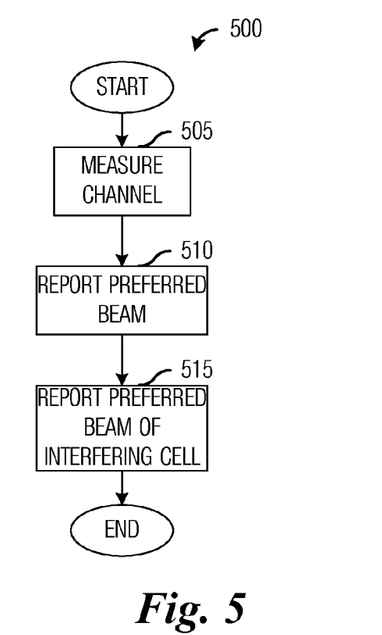
FIG. 5 is a flow diagram of UE operations in coordinated beam switching.

FIG. 5 illustrates a flow diagram of UE operations 500 in coordinated beam switching. UE operations 500 may be indicative of operations occurring in a UE served by a NB, while the NB is computing scheduling information.

UE operations 500 may begin with the UE measuring the signal to interference ratio of pilots or other reference signals transmitted by the NB, i.e., the UE may be performing channel estimation on the NB (block 505). The pilots or other reference signals may be precoded with the beam patterns used by the NB (i.e., the precoding matrices used by the NB to produce the beam patterns). The UE may also measure interference caused by neighboring NBs.

The UE may then report beam information related to a preferred beam pattern transmitted by the NB, wherein the preferred beam pattern may be the beam pattern transmitted by the NB that results in the highest signal to interference ratio measurement measured by the UE (block 510). The beam information may be the actual signal to interference ratio measurements made by the UEs for the various beam patterns. Additionally, the beam information may also include an index or some other reference information that indicates the beam pattern that resulted in the highest signal to interference ratio measurement. Examples of the index include precoder vector index (PVI) or beam index.

Alternatively, instead of reporting the highest signal to interference ratio measurement (and/or an index indicating the beam pattern with the highest signal to interference ratio measurement), the UEs may report the highest received signal strength measurement (and/or an index indicating the beam pattern with the highest received signal strength measurement) to the NB. Instead of reporting the highest signal to interference ratio measurement, the use of the beam pattern with the highest received signal strength measurement may result in a higher channel capacity.

Alternatively, instead of reporting only the highest signal to interference ratio measurement, the UEs may report all signal to interference ratio measurements that exceed a specified threshold. The use of a specified threshold may allow the NB to obtain network resources to meet a performance criteria, such as a quality of service (QoS) requirement. For example, if in practice, the NB determines that a threshold is not yielding a sufficient number of transmission opportunities for a UE to meet a QoS requirement, then the NB may lower the threshold so that the UE may report back a larger number of beams with signal to interference ratio measurements exceeding the threshold. With a larger number of beams, there may be a larger number of transmission opportunities to transmit to the UE or for the UE to transmit. For example, the threshold may be adjusted based on satisfaction of the QoS requirement. If a UE is not being served at a sufficiently high rate to meet the QoS requirement, then the threshold may be lowered, otherwise the threshold may be increased (to reduce signaling overhead, for example).

In addition to measuring the pilots or other reference signals transmitted by the NB, the UE may measure pilots or other reference signals of neighboring NBs to determine the best interferers (i.e., the smallest interferers). The UE may measure pilot or other reference signals only from neighboring NBs that are closest to the UE since interference from neighboring NBs that are further away may be small. Alternatively, the UE may measure the pilots or other reference sequences of all detectable neighboring NBs.

From the measurement of pilots or other reference signals of neighboring NBs, the UE may report beam information related to a preferred interferer, i.e., the smallest measured received signal strength (block 515). The beam information may be the actual received signal strength measurements made by the UE for the various pilots or other reference signals transmitted by the neighboring NBs. Additionally, the beam information may also include an index or some other reference information that indicates the beam pattern that resulted in the highest received signal strength measurement.

The UE may transmit an index corresponding to a beam pattern with the highest signal to interference ratio measurement (or a set of indices of beam patterns with signal to interference ratio measurements exceeding the threshold). The NB may reference the beam pattern from the index transmitted by the UE.

Alternatively, instead of transmitting the index, the UE may transmit a time corresponding to when it measured the highest signal to interference ratio (or a set of times if reporting multiple beam patterns). The time transmitted by the UE may be an absolute time or an offset referenced to a reference time.

In an alternative embodiment, the UE does not know the beam cycling pattern but it may know the M unprecoded interference channels and indicates what an acceptable interference precoder (or equivalently, an unacceptable or worse precoder) is for the M strongest interferers and what the M strongest interfering neighbor NBs are. An advantage is that the UE does not need to know the beam cycling pattern, which saves network overhead since the NB does not need to broadcast the beam cycling pattern to the UE. The UE may simply indicate which interferers should use (or should not use) which precoder and let the NB determine (from the scheduling information) when the combination of beam pattern transmitted by the NB and interferers transmitted by neighboring NBs would happen again. If the exact combination of beam pattern and interferers does not exist in the scheduling information, then the NB may be able to find a closest match based on beam substitution as described previously.

In yet another alternative embodiment, the NB may combine multiple beam patterns into a wide beam pattern. The NB may also cycle through a beam cycle pattern for the wide beam patterns. For example, referencing FIG. 2, cell 0 205 may combine beams 235 and 236 into a first wide beam, beams 236 and 237 into a second wide beam, and beams 237 and 238 into a third wide beam. Cell 0 205 may then cycle through the first, second, and third wide beams. Furthermore, more than two beam patterns may be combined into wide beam pattern.

In yet another alternative embodiment, the NB may combine multiple beam patterns that are well separated from each other and can transmit different data in a multi-user multiple input, multiple output (MU-MIMO) like manner (also commonly referred to as space division multiple access (SDMA)) over the two beams to two different UEs. For example, referencing FIG. 2, cell 0 205 may combine beams 235 and 238 into a single beam and transmit different data to two different UEs. If there is a large number of beam patterns, multiple widely separated beams may be created and they too may be cycled through.

This MU-MIMO like technique is predictable in the way that the NB interacts with neighboring NBs. For example, if the NB uses MU-MIMO for a particular subframe, then it repeats the use of MU-MIMO (with the same power allocations) every beam cycle pattern. This results in repeatable interference patterns at neighboring NBs. This allows the UEs to simply measure the signal to interference ratio as before. The signal to interference ratio may depend on the type of interference, but the value would be substantially repeatable. This embodiment may work best when the pilots are beamformed. With pilots that are not beamformed, then the NB may instruct the UEs to report the best L beams that an interferer may use and indicate how much additional degradation in signal to interference ratio the L−1 beams will cause.

However, it is assumed that all NBs are performing beam switching and therefore the other NBs cannot perform transmit diversity or single user (SU) MIMO. However, it is unlikely that a NB would perform transmit diversity or SU-MIMO with a correlated antenna array. However, with an uncorrelated antenna array, the SU-MIMO interference may be made deterministic, just as in the MU-MIMO example discussed previously.

In another alternative embodiment, all of the NBs are fully coordinated and a central scheduler has full knowledge of the channel conditions of all UEs. A global optimum selection of beam patterns and UEs may then be performed.

Figure 6:
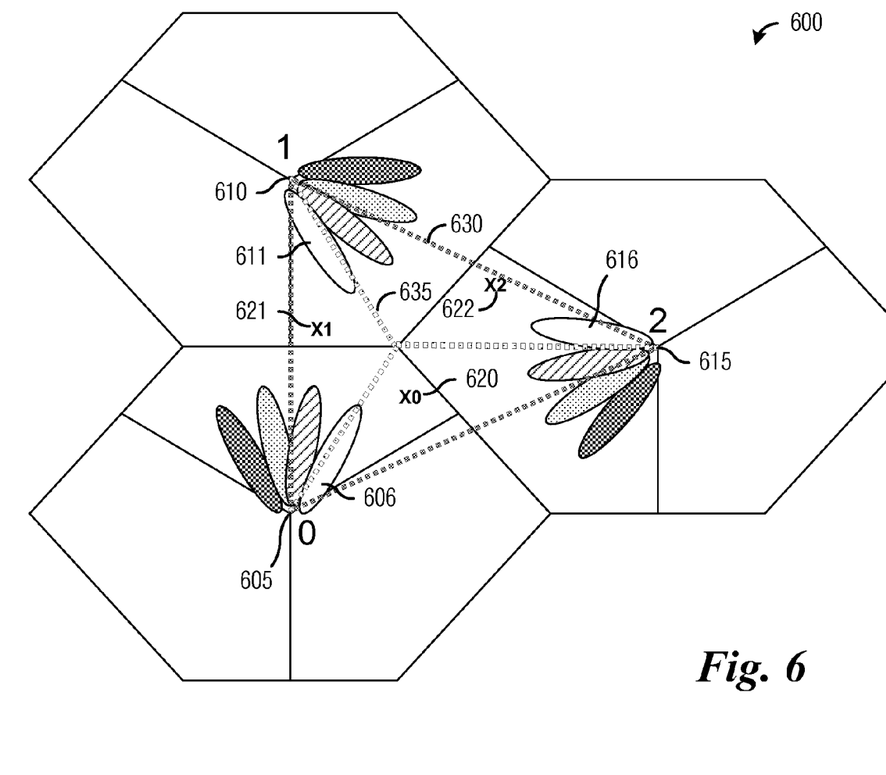
FIG. 6 is a diagram of a cluster of cells, wherein the cells in the cluster of cells are using beam pattern switching for uplink transmissions.

FIG. 6 illustrates a cluster of cells 600, wherein the cells in cluster of cells 600 are using beam pattern switching for uplink transmissions. Since UEs may be scheduled according to which beam pattern from their respective serving NB that they prefer, the NBs may agree to serve certain groups of UEs at specific times. This would mean that the spatial correlation of the interference caused by each UE to a neighboring NB may be more predictable. For example, as shown in FIG. 6, cell 0 605 schedules UE X0 620, cell 1 610 schedules UE X1 621, and cell 2 615 schedules UE X2 622 all to transmit in beams 606, 611, and 616, which may use the same precoding matrix. The use of the same precoding matrix for all of the uplink transmissions may cause minimum interference on the uplink since an area representing a main interference region (dotted triangle 630) may be further subdivided by the beams with spatial footprints indicated by the intersecting dotted lines 635.

In another alternative embodiment, the UEs do know the beam cycling pattern of the NB and the neighboring NBs (or the scheduling information of the NB) and can indicate to the NB when it expects to see a similar signal to interference ratio, i.e., when the combination of beam pattern and interference is expected to appear again. An advantage is that uplink overhead may be smaller since the UEs do not need to indicate the preferred interferer or its precoder. The UE may instead send to the NB a time that indicates to the NB when the signal to interference ratio measurement was made and the NB may schedule the UE at a similar time in the future where the combination of beam pattern and interference occurs once again.

Figure 7A:
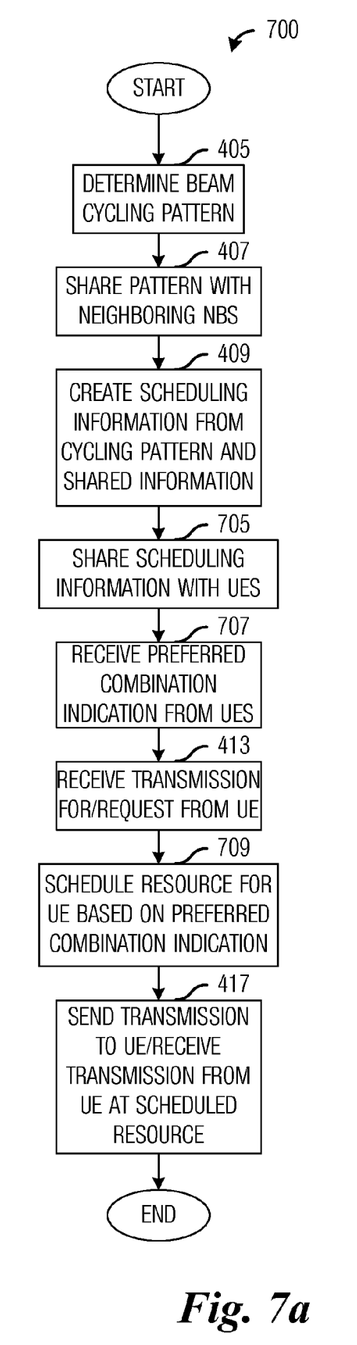
FIG. 7a is a flow diagram of NB operations in coordinated beam switching, wherein the network cycle information is shared with the UEs.

FIG. 7a illustrates a flow diagram of NB operations 700 in coordinated beam switching, wherein the network cycle information is shared with the UEs. NB operations 700 may be indicative of operations taking place in a NB (cell) as it schedules transmissions for UEs that it is serving. The scheduling of transmissions for UEs may comprise two distinct stages. A first stage includes computing scheduling information for UEs that it is serving based on beam cycling patterns from neighboring cells, and a second stage includes scheduling transmissions for the UEs using the scheduling information. NB operations 700 may take place while the NB is in normal operating mode, with the computing of the scheduling information occurring periodically, such as once every few hundred frames, for example. Alternatively, the computing of scheduling information may take place when an event occurs. For example, an event may be a performance metric exceeding a threshold, a traffic distribution being served by the NB changes by a specified amount, a change in beam cycling patter or period, and so forth.

NB operations 700 may begin with the NB determining a beam cycling pattern (block 405). The beam cycling pattern of the NB may be based on factors such as traffic distribution, nature of traffic, number of UEs being served, ULE distribution, and so on. With the beam cycling pattern set, the NB may share its beam cycling pattern (and potentially, beam cycling pattern period) with its neighboring NBs (cells) (block 407). The sharing of the beam cycling pattern may be communicated between the NBs over a backhaul connecting the NBs. In addition to sharing its beam cycling pattern, the NB may receive beam cycling patterns as well as beam cycling pattern periods (if NBs are permitted to have different beam cycling pattern periods) from its neighboring NBs. From its own beam cycling pattern and the beam cycling patterns and beam cycling pattern period from its neighboring NBs, the NB may create scheduling information (block 409).

The NB may then share the scheduling information with the UEs that it is serving (block 705). The NB may simply broadcast the scheduling information to the UEs. Alternatively, instead of broadcasting the scheduling information, the NB may broadcast its beam cycle pattern (and potentially, the beam cycle pattern period) along with beam cycle pattern (and period) from the neighboring NBs to the UEs. The UEs may then create their own scheduling information. The NB may then transmit pilots or other reference sequences using the beam patterns as specified in the beam cycle pattern.

The NB may then receive an indication from each of the UEs (block 707). The indication from the UE may indicate a preferred beam pattern and interferer combination for the UE. For example, the preferred beam pattern and interferer combination may correspond to a beam pattern and interferer combination that resulted in a highest signal to interference ratio measurement by the UE. Alternatively, the indication may indicate multiple preferred beam pattern and interferer combinations, wherein the multiple preferred beam pattern and interferer combinations all resulted in measured signal to interference ratios exceeding a threshold.

The NB may then receive a transmission intended for a UE that it is serving or a transmission request from a UE that it is serving (block 413). The NB may make use of preferred beam pattern and interferer combination provided by the UE to determine a network resource(s) to allocate to the transmission (block 709). If the NB received a transmission request from the UE, then the NB may send an indication to the UE indicating the network resource(s) allocated to the UE. The NB may then transmit to the UE at the allocated network resource(s) or receive a transmission from the UE at the allocated network resource(s) (block 417). NB operations 700 may then terminate.

Figure 7B:
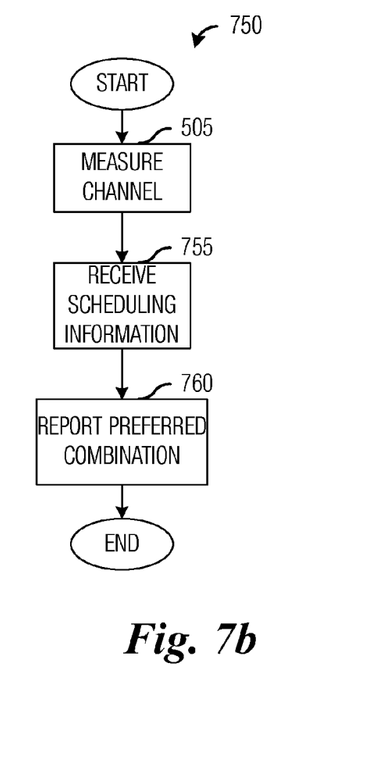
FIG. 7b is a flow diagram of UE operations in coordinated beam switching, wherein the network cycle information is shared with the UEs.

FIG. 7b illustrates a flow diagram of UE operations 750 in coordinated beam switching, wherein the network cycle information is shared with the UEs. UE operations 750 may be indicative of operations occurring in a UE served by a NB, while the NB is computing scheduling information.

UE operations 500 may begin with the UE measuring the signal to interference ratio of pilots or other reference signals transmitted by the NB, i.e., the UE may be performing channel estimation on the NB (block 505). The pilots or other reference signals may be precoded with the beam patterns used by the NB (i.e., the precoding matrices used by the NB to produce the beam patterns). The UE may also measure interference caused by neighboring NBs.

The UE may then receive scheduling information in a broadcast made by the NB (block 755). Alternatively, the UE may receive beam cycle pattern (and potentially, the beam cycle pattern period) of the NB along with beam cycle pattern (and period) from the neighboring NBs broadcast by the NB. The UE may then create its own scheduling information.

The UE may select a highest signal to interference ratio measurement and using the scheduling information, determine an index or time offset of a beam pattern and interferer combination that matches up with the highest signal to interference ratio. The UE may then report the index or time offset back to the NB (block 760). Alternatively, the UE may select the measured signal to interference ratio(s) exceeding a threshold and then using the scheduling information, determine indices or time offsets of beam pattern and interferer combinations that matches up with the measured signal to interference ratios exceeding the threshold. The UE may report the indices or time offsets. UE operations 750 may then terminate.

Although the discussions focus on sectors having the same number of distinct beam patterns (precoding matrices), beam pattern spatial widths, beam cycle pattern periods, and so forth, in practice, each sector may use different numbers of distinct beam patterns, beam pattern spatial widths (wide, medium, narrow, combination, or so on), beam cycle pattern periods, and so on. The beam patterns transmitted by the sectors, however, generally should repeat with period T, where T is the period of the network cycle.

Performance simulations were performed to evaluate coordinated beam switching. Table 2 summarizes simulation parameters.

TABLE 2

System simulation settings

| | |
|---|---|
| Number (Tx, Rx) | (4, 2) |
| Antenna Separation (Wavelength) | (0.5, 0.5) |
| Channel Model | SCM |
| Scheduler | Proportional Fair |
| Users per Cell | 10 |
| Control Overhead | None |
| HARQ | None |
| Receiver Processing | MRC |
| FFT size, Bandwidth | 512, 5 MHz |
| STS Distance | 500 m |
| Link to System | Effective SNR/Mutual Information |
| Shadow Fading | 8 dB |
| Isolation | 20 dB |
| NB Tx Power | 20 W |
| Rank Adaptation | None - only Rank 1 transmissions |
| UE Speed | 3 km/h |

Figure 8:
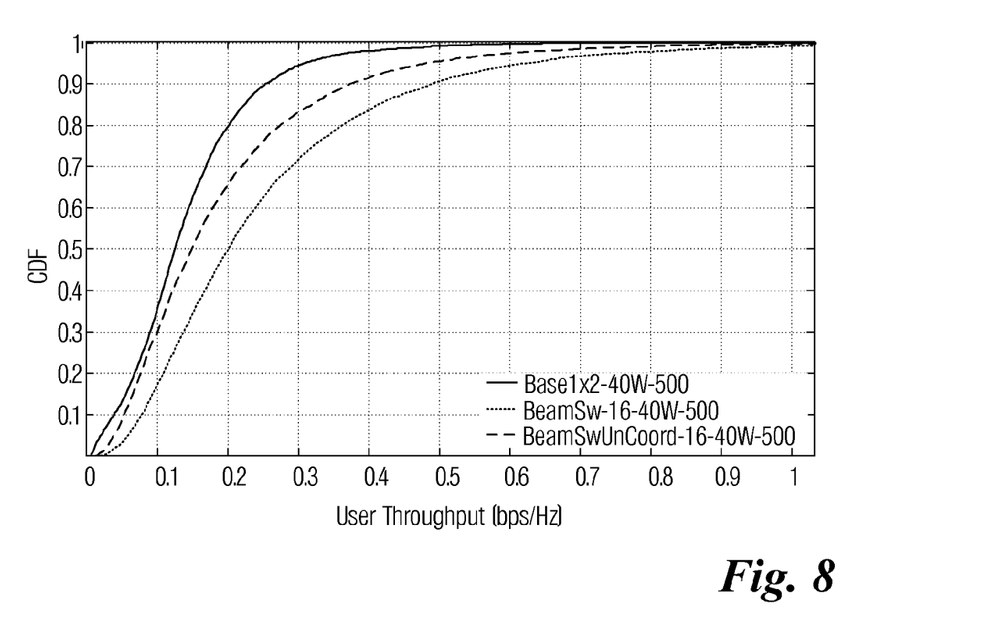
FIG. 8 is a data plot of a cumulative distribution function of user throughput.

The simulations compare coordinated beam switching with baseline wireless communications system operation and precoder vector index feedback with uncoordinated beam switching. The simulation results show that coordinated beam switching provides significant performance gains over uncoordinated beam switching and the baseline wireless communications system operation. Table 3 summarizes the simulation results and FIG. 8 illustrates a cumulative distribution function of user throughput.

TABLE 3

Simulation Results

| | Cell AVG | Cell Edge |
|---|---|---|
| Base 1 × 2 | 1.4274 | 0.0377 |
| Uncoordinated BeamSwitch 4 × 2 | 1.9183 | 0.0519 |
| Coordinated Beamform 4 × 2 | 2.5331 | 0.0789 |
| Coord Gain over 1 × 2 | 77% | 109% |
| UnCoord Gain over 1 × 2 | 34% | 38% |

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for controller operation, the method comprising:
    determining a beam cycle pattern, the beam cycle pattern comprising a list of beam patterns transmitted by the controller;
    sharing the beam cycle pattern with neighboring controllers;
    generating scheduling information from the beam cycle pattern and beam cycle patterns from other controllers;
    receiving beam information from a communications device;
    receiving a transmission intended for the communications device; and
    causing the transmission to be transmitted to the communications device, wherein the transmission is transmitted using the scheduling information and the received beam information.

2. The method of claim 1, further comprising, transmitting reference sequences precoded with the beam patterns in the beam cycle pattern.

3. The method of claim 1, wherein sharing the beam cycle pattern comprises:
    sending the beam cycle pattern to the neighboring controllers; and
    receiving the beam cycle patterns from the neighboring controllers.

4. The method of claim 3, wherein sending the beam cycle pattern further comprises sending a period of the beam cycle pattern.

5. The method of claim 3, wherein generating scheduling information comprises, generating all combinations of beam patterns in the beam cycle pattern and beam patterns from the beam cycle patterns from neighboring controllers.

6. The method of claim 5, wherein each beam pattern transmitted by the controller results in a corresponding received signal strength level at the communications device, wherein each beam pattern transmitted by a neighboring controller results in a corresponding interference level at the communications device, and wherein generating scheduling information further comprises:
  combining beam patterns producing substantially equal received signal strength levels into replacement beam patterns, wherein there is one replacement beam pattern per set of beam patterns producing substantially equal received signal strength levels;
  combining beam patterns from a single neighboring controller producing substantially equal interference levels into replacement interference beam patterns, wherein there is one replacement interference beam pattern per set of beam patterns from a single neighboring controller producing substantially equal interference levels; and
  substituting beam patterns in the scheduling information with associated replacement beam patterns or replacement interference beam patterns.

7. The method of claim 1, wherein the beam information comprises an index of one of the beam patterns transmitted by the controller and at least one index of a neighbor beam pattern transmitted by one of the neighboring controllers that results in a highest measured signal to interference ratio at the communications device.

8. The method of claim 1, wherein the beam information comprises an index of a beam pattern transmitted by the controller and at least one index of a neighbor beam pattern transmitted by one of the neighboring controllers that results in a measured signal to interference ratio exceeding a threshold.

9. The method of claim 1, wherein causing the transmission to be transmitted comprises:
  selecting a first index to a network resource from the scheduling information based on the transmission and the received beam information;
  scheduling the transmission for the network resource based on the first index; and
  transmitting the transmission at the occurrence of the network resource.

10. The method of claim 9, wherein the scheduling information comprises all combinations of beam patterns in the beam cycle pattern and beam patterns from beam cycle patterns from neighboring controllers, and wherein selecting a first index comprises, selecting a second index of a combination of beam patterns in the beam cycle pattern and beam patterns from the beam cycle patterns from neighboring controllers corresponding to the received beam information.

11. A method for communications device operation, the method comprising:
  measuring a first communications channel between a controller and the communications device for each beam pattern in a beam cycle pattern of the controller, thereby producing a plurality of channel estimates;
  measuring a second communications channel between a neighboring controller and the communications device for each beam pattern in a beam cycle pattern of the neighboring controller, thereby producing a plurality of interference estimates; and
  reporting indices of one of the beam patterns in the beam cycle pattern of the controller and one of the beam pattern in the beam cycle pattern of the neighboring controller meeting a criteria, wherein the criteria is based on the plurality of channel estimates and the plurality of interference estimates.

12. The method of claim 11, wherein the criteria comprises a highest measured signal to interference ratio.

13. The method of claim 11, wherein the criteria comprises a measured signal to interference ratio exceeding a threshold.

14. The method of claim 11, wherein the criteria comprises a highest received signal strength.

15. The method of claim 11, wherein the beam patterns in the beam cycle pattern of the controller are used to precode a reference sequence.

16. A method for controller operation, the method comprising:
  determining a beam cycle pattern, the beam cycle pattern comprising a list of beam patterns transmitted by the controller;
  sharing the beam cycle pattern with neighboring controllers;
  generating scheduling information from the beam cycle pattern and beam cycle patterns from other controllers, the scheduling information comprises all combinations of beam patterns in the beam cycle pattern and beam patterns from the beam cycle patterns from neighboring controllers;
  transmitting information related to the beam cycle pattern to a communications device;
  receiving an index to a preferred beam pattern in the beam cycle pattern and beam patterns from beam cycle patterns from neighboring controllers;
  receiving a transmission intended for the communications device; and
  causing the transmission to be transmitted to the communications device, wherein the transmission is transmitted using the received index.

17. The method of claim 16, wherein the index comprises an offset into the scheduling information.

18. The method of claim 16, wherein causing the transmission to be transmitted comprises:
  selecting a network resource index to a network resource from the scheduling information based on the transmission and the received index;
  scheduling the transmission for the network resource based on the network resource index; and
  transmitting the transmission when the network resource appears.

19. The method of claim 16, wherein the information related to the beam cycle pattern comprises the beam cycle pattern and the beam cycle patterns from neighboring controllers.

20. The method of claim 16, wherein the information related to the beam cycle pattern comprises the scheduling information.

* * * * *